March 14, 1967 J. GARDNER ET AL 3,309,140
LEACHING OF URANIUM ORE IN SITU
Filed Nov. 28, 1962

INVENTOR
JOHN GARDNER
MALCOLM I. RITCHIE
BY
ATTORNEYS

United States Patent Office 3,309,140
Patented Mar. 14, 1967

3,309,140
LEACHING OF URANIUM ORE IN SITU
John Gardner, Los Altos, Calif., and Malcolm I. Ritchie, Riverton, Wyo., assignors to Utah Construction & Mining Co., San Francisco, Calif., a corporation of Delaware
Filed Nov. 28, 1962, Ser. No. 240,576
6 Claims. (Cl. 299—4)

This invention relates to a technique of mining and more particularly to the recovery of minerals without the necessity of exposing and physically handling the ore. More specifically it relates to the recovery of such minerals in formations located below the water table and regardless of the depth of the deposit.

At the present time many uranium and similar mines are irregularly distributed throughout the Western United States; their size and distribution depending, of course, on the size and distribution of the ore bodies. Frequently these ore bodies are found in remote regions and, in addition, the concentration of mineral in the deposit and the size of the deposit does not warrant commercial development.

In addition, conventional mining operations are impractical for mining even an extremely valuable ore body, if the same is located at a great depth from the surface, because of the necessity of exposing the ore and handling it at great depths.

It is an object of this invention to provide a method of leaching uranium ore from an underground deposit situated below a water table by leaching the same with an acidic solution without the use of heat or excessive pressure.

It is a further object of this invention to provide a method of recovering uranium from an underground deposit of a uranium mineral by injecting a cold acidic solution into direct contact with the underground deposit in situ and influencing the path of the injected fluid by the introduction of a low pressure gradient which is created by the removal of fluid at a centrally disposed recovery well.

It is a further object of this invention to provide a method of minimizing solution loss and dilution by the influx of environmental water by the regulation of input and output volumes of the solution.

Figure 1:
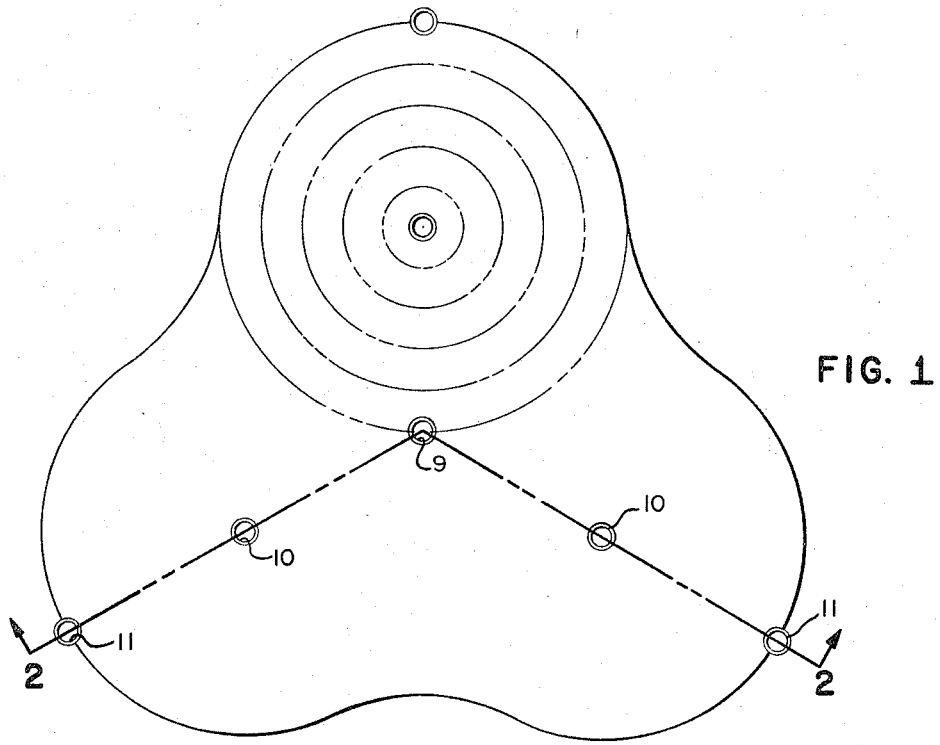
Figure 2:
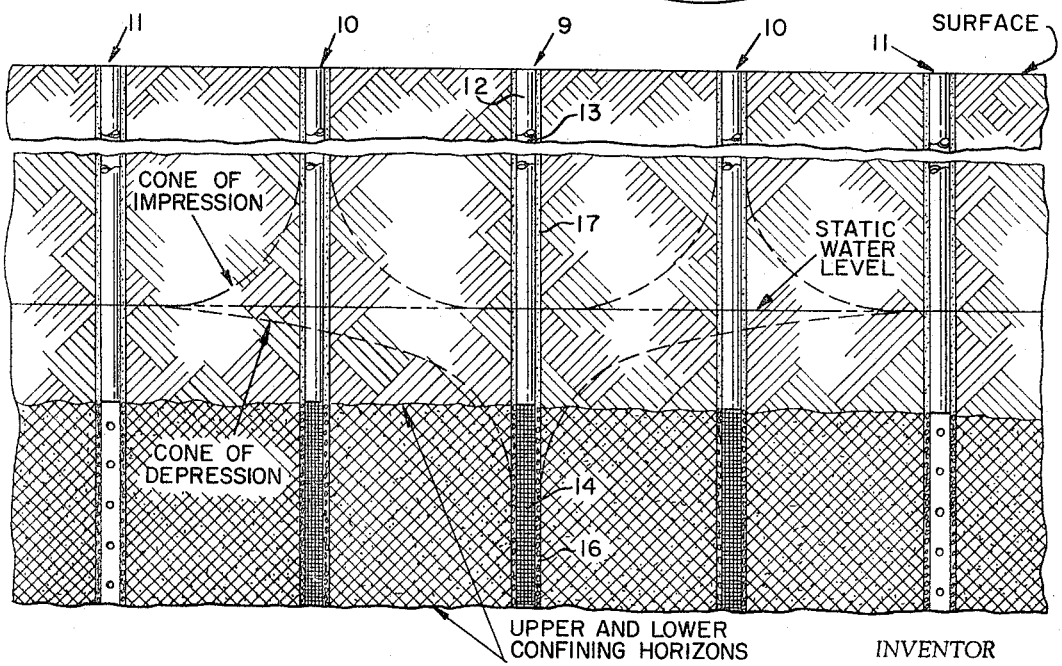

Other objects and advantages of this invention will be apparent with the following descriptions taken in conjunction with the accompanying drawing, in which:

FIGURE 1 represents a form of drilling pattern and illustrates a central recovery well, a plurality of injection wells spaced therefrom, a plurality of peripheral monitor wells, and, in dotted lines, the leach area, and FIGURE 2 is a schematic view taken along line 2—2 of FIGURE 1 showing a leach area in which the method is used and illustrates the central recovery well, the injection wells, and the peripheral monitor wells, together with the cones of depression, cones of impression, upper horizon of the ore, lower horizon of the ore and the static water level, all as indicated.

The method of recovering uranium from an underground deposit of a uranium ore involves essentially the introduction, directional control, and recovery of a selected acidic solvent solution into and from the underground deposit through suitably located injection and recovery wells which define the leach area.

The mineralized area is first explored. Cores are drilled and studies of the drill core are made to determine the permeability, porosity, and water bearing characteristics of the formation. In this manner, the area and configuration of the underground deposit, the pattern of the injection and recovery wells, and the anticipated solution flow rates in the leach area can be determined. Analysis of the ore permits the determination of the proper reagent concentration. The pattern and the number of the wells will depend upon the permeability, porosity, and water bearing characteristics of the underground deposit. The more permeable and porous the deposit, the greater the distance permitted between wells.

Having determined their number and spacing, the wells are drilled in accordance with a selected pattern, completed, and developed. The pattern will generally consist of a centrally disposed recovery well 9, a plurality of injection wells 10 spaced from and around it and a plurality of monitor wells 11. In the pattern indicated generally in FIGURE 1, the injecting wells 10 are approximately fifty feet apart and are spaced approximately thirty-five feet from the recovery well 9. The distances may be greater or less depending upon the permeability and porosity of the formation. Casing 12 is set in the well bore 13 down to a point adjacent the upper horizon of the ore and terminates in a slotted screen 14 whose length is determined by the thickness of the ore body.

The screen terminates in the area of the impermeable bottom and the space between the well bore 13 and the screen 14 is packed with sized gravel 16. The annular space between the well bore 13 and the casing 12, above the screen 14, and above the upper horizon of the ore, is then sealed, and it has been found that the most effective seal 17 for this application is a chemical gel which can be introduced as a solution and which has a triggering catalyst whereby gel time and the position of the seal can be accurately determined. In addition, this type of seal acts and remains in gel form whereby the casing 12 and the screen 14 may be withdrawn and reused.

It goes without saying that all materials used in the wells must necessarily be resistant to the corrosive properties of the reagents employed.

On completion of the wells, a volume of leach solution, sufficient to displace the reservoir fluid within the planned pattern, is introduced into the ore zone through the injection wells 10 at a pressure below formation fracture pressures. Solution so injected will, when released below the water table, form a more or less circular pool having positive pressure at each injection point and as inflow continues the pool will expand until merging with similar pools created at other injection wells 10 at which time the reservoir water will have been replaced with leach solution in the area of interest.

Tracking and eventual control of this expanding front is accomplished by observing variation in static water level in wells 11 located at the planned perimeter of the leach pattern. A rise in water level in monitor wells 11 indicates that the contained area has been filled and is at a pressure above that of the surrounding reservoir and, in fact, that a high pressure island has been formed.

At this time pumping from the recovery well 9 is started at a rate equal to the combined inflow volume of the injection wells 10. It will be apparent that by maintaining this balance between inflow and outflow the "island" will remain intact, thus preventing dilution of the leach solution with reservoir water although some losses of leach solution may occur.

From here on, the pattern is operated on this single pass solution flow system until satisfactory mineral recovery has been obtained.

During the operation of the pattern as described the injection of leach solution into the injection wells 10 tends to create a volume of increased pressure about the well 10, an equipotential of which is indicated as a cone of impression in the drawing. Likewise, pumping out the recovery well 9 tends to create a volume of reduced pressure about the well 9, an equipotential of which is indicated as a cone of depression in the drawing.

Close control of solution is possible throughout the operation by regulation of water level in the monitor wells 11 and by recovery of tracer which is introduced in the injection wells 10 along with the leach solution.

Uranium is then recovered from the pregnant solution in a manner more fully hereinafter described.

This method was used in a particular ore body in the following manner:

Radiometric probes located the exact position of the ore and contact was made at 331 feet below the surface. Initial exploration having proved the existence of a mineral area, further study showed the area to have the following characteristics:

Static water level was found to be at 300 feet below the surface.

Formation permeability indicated that a four spot pattern would be more suitable with injection wells 10 spaced 25 feet from the recovery well 9.

The formation would support flow rates of 20 g.p.m. a minute at each injection well 10 and 60 g.p.m. per minute from the recovery well 9.

Solvent concentration was set at 10 gm./l. nitric acid, 1 gm./l. sodium chlorate and 10 p.p.m. flocculant (Separan).

Nitric acid was selected as the mineral acid in preference to less costly sulphuric acid, because of a high calcium content of the ore body to be leached. Passage of sulphuric acids through the ore would result in the chemical formation of calcium sulphate and this compound, being insoluble, causes blockage of the formation resulting in loss of permeability. Calcium nitrate, on the other hand, is soluble in water and does not present this problem.

Hydrochloric acid could be used equally as well as nitric acid except that it is more expensive and does not have the same oxidizing power as does the nitric acid.

Average daily production on this particular ore body was approximately 500 lbs. $U_3O_8$ over a period of approximately 30 days and tracer recovery was approximately 90% thus proving our close control of the leach solution. At the end of the operation samples taken from the monitor wells 11 had a neutral pH showing that the solution control was as planned.

It has been found that contacting uranium bearing ore with any mineral acid causes the liberation of hydrogen sulphide, probably due to the reaction with soluble sulphides such as pyrrhotite and, because of the pressure involved, also creates a highly reducing atmosphere. Under these conditions, optimum extraction of uranium is impossible. To counteract the reducing atmosphere, an oxidant, such as sodium chlorate, is added to the leach solution. The function of the oxidant is to convert ferrous iron into ferric iron which, in turn, promotes the conversion of tetravalent uranium to hexavalent uranium, the hexavalent form being soluble in dilute acid and the tetravalent form being relatively insoluble. The chemical reactions may be set forth as follows:

$$U_3O_8 \longrightarrow \underset{\text{uraanyl oxide}}{2UO_3} + \underset{\text{uranous oxide}}{UO_2}$$

$$Fe^{++} \xrightarrow[\substack{\text{in presence} \\ \text{of acid}}]{NaClO_3} Fe^{+++}$$

$$UO_2 + 2UO_3 + 2Fe(NO_3)_3 + 4HNO_3 \longrightarrow$$
$$3UO_2(NO_3)_2 + 2Fe(NO_3)_2 + 2H_2O$$

or $$UO_2 \xrightarrow[\text{and acid}]{Fe^{++}} UO_3$$

$$UO_3 + 2HNO_3 \longrightarrow \underset{\text{uranyl nitrate}}{UO_2(NO_3)_2} + H_2O$$

Other oxidants could be used to assist the oxidizing effect of nitric acid but sodium chlorate is most economical in the ore body under consideration.

A high molecular weight polymer of acrylamide (a flocculating agent) is introduced into the leaching solution to assist in maintaining permeability of the ore body. During the process of leaching, clays contained in the ore body are dislodged and carried away with the solution flow accumulate and pack together resulting in an impermeable film which blocks the passage of solution. The flocculating holds the fine clay particles in a sponge-like mass by electrostatic or ionic attraction which does not pack in an impermeable film but allows the solution to filter through.

An effective leaching solution for the dissolution of uranium from the ore body under consideration consists of water, containing 5 to 25 gms./l. nitric acid, 0.5 to 2.0 gms./l. sodium chlorate, and 5 to 25 p.p.m. flocculating agent.

The pregnant solution contains uranium and other cations, such as hydrogen, iron, aluminum, magnesium, calcium, etc., and has as associated anions, nitrate and some chloride and sulphate. The concentration of uranium in the pregnant solution will vary from zero to 5 gms./l. $U_3O_8$ depending upon the stage of leaching, and, therefore, it is desirable to recover the uranium from the solution in the concentrated form prior to shipment to processing mills for final purification.

The pregnant solution may be processed in any suitable way. Two such processes have been utilized and have been found economical: (1) direct precipitation and (2) selective ion exchange into an organic solvent with subsequent removal from the organic phase of the stripping agent.

Direct precipitation may be carried out as follows: Uranium salts will precipitate from an acidic nitrate environment if the solution is neutralized to pH 7.5 with a strong base salt such as sodium hydroxide or ammonium hydroxide. The following equations represent the reactions:

$$UO_2(NO_3)_2 + 2NH_4OH + (x-1)H_2O \longrightarrow$$
$$UO_3 \cdot xH_2O + 2NH_4NO_3 2UO_3xH_2O + 2NH_4OH \longrightarrow$$
$$\underset{\text{ammonium diuranate}}{(NH_4)_2U_2O_7} + (2x+1)H_2O$$

In addition to the precipitated ammonium, or sodium diuranate (if sodium hydroxide is used), other basic salts are precipitated from some of the other cations present. The sludge is allowed to separate from the solution in either a settling tank or pond. Thus, the uranium is concentrated into a bulk slurry and the clear neutral liquor is allowed to proceed to another stage in the process.

The recovery of uranium by the direct precipitation method is improved if the pregnant liquor is conditioned prior to its neutralization. The solution that is recovered from the underground leach area is contaminated with hydrogen sulphide and carbon dioxide which interfere with uranium precipitation. Hydrogen sulphide may be removed from the solution by violent air agitation for a period of fifteen to thirty minutes. Carbon dioxide is associated with the uranium in the form of a carbonate complex having a probable ionic formula of $$UO_2(CO_3)_3{}^{----}$$

The uranium in this complex will not be precipitated unless the pH is carried to between 10.5 and 12.0. Since over-neutralization is costly and can (practically) only be done with sodium hydroxide, the carbon dioxide in the carbonate is removed by passing the pregnant solution through a tower under vacuum. The solution is now conditioned for direct precipitation.

Another method of treating the pregnant solution has successfully been operated; that is, selective ion exchange onto an organic solvent, with subsequent removal from the organic phase with the stripping agent. The uranium in the solution may be exchanged into an alkyl phosphoric acid solvent with high efficiency without interference from the other ions present. An organic mixture of ethylhexyl phosphoric acid (EHPA), iso-decanol, and in kerosene has been used. EHPA is:

and its exchange with $UO_2(NO_3)_2$ is represented by:

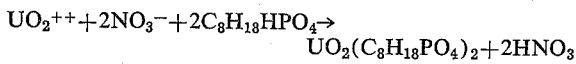

$$UO_2^{++} + 2NO_3^- + 2C_8H_{18}HPO_4 \rightarrow UO_2(C_8H_{18}PO_4)_2 + 2HNO_3$$

The sodium salt of the dialkyl phosphoric acid will follow the reaction equally well.

In practice, the pregnant liquor is contacted with the organic mixture and stirred violently. It is important to maintain an excess of 1:1 organic-aqueous ratio (the excess favoring the organic phase) or an emulsion formation is probable. One minute retention time is adequate for extraction equilibrium in the mixer. The mixture is then pumped to a suitable settling tank which has sufficient area to allow complete phase separation. The optimum extraction of uranium into the organic phase is achieved in four stages of mixer-settlers.

Iso-decanol increases the solubility of EHPA in kerosene and does not materially add to the affinity of the organic mixture for uranium. Kerosene is a relatively cheap carrier for the two working organic compounds. The mixture found to be the most economical in this circuit consists of 3% by volume EHPA, 2% iso-decanol, and 95% kerosene.

The loaded organic solution is stripped of its uranium counter-currently again in similarly designed mixer-settlers.

Several basic salt and high-strength mineral acid solutions can be used as stripping agents for the uranium contained in the loaded organic solution. However the most economical in the solution under consideration is either sulphuric acid or sodium carbonate. The chemical reaction, using $Na_2CO_3$, is probably represented by the following equation:

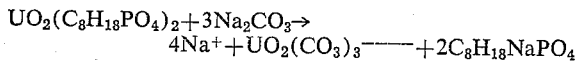

$$UO_2(C_8H_{18}PO_4)_2 + 3Na_2CO_3 \rightarrow 4Na^+ + UO_2(CO_3)_3^{----} + 2C_8H_{18}NaPO_4$$

The stripped organic solution is now recycled to the extraction circuit and the strip solution, containing all of the uranium, is sent to the process mill for final purification.

Recovery of uranium in the circuit described is virtually 100 percent, and concentrations obtained are in the order of 50:1 on an average.

Uranium-free solution from either the described precipitation circuit or from the solvent-extraction circuit cannot be discarded to waste into ground water systems due to the high nitrate ion content. A very satisfactory method for metallic cation removal using cation ion-exchange resin in hydrogen form produces a resultant mineral acid product suitable for recycle to underground leaching. Recirculation of this solution without metallic cation removal would promote blockage of the formation.

The raffinate from the solvent-extraction circuit contains primarily $Ca^{++}$, $Fe^{++}$, $Mg^{++}$, and $Al^{+++}$ as exchangeable cations associated with $NO_3^-$ anions. Cation resin is a sulphonated styrene-divinyl-benzene copolymer supplied in the form of beads. When the raffinate is passed through the hydrogen form of the resin, the contained di- and tri-valent cations are exchanged for hydrogen ion, $H^+$, e.g.,

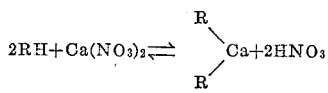

and

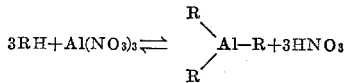

(where R represents the copolymer)

A typical raffinate from the EHPA solvent circuit will analyze 6.5 gms./l. $NO_3$, of which 2.5 gms./l. are already associated with $H^+$ as nitric acid residual from leaching. The cations associated with the neutral nitrate will be exchanged and the ion-exchange product will analyze 6.5 gms./l. $HNO_3$. This solution, brought up to leaching strength with fresh acid, can be recirculated to underground.

The ion exchange is carried out continuously in a multiple-cell circuit. When a bed of resin has exhausted its exchange potential, it is replaced by a freshly regenerated bed. Regeneration or metallic cation removal is conducted in two stages:

(a) Passage of a sodium chloride or brine solution of sufficient strength causes the exchange to reverse and the di- and tri-valent metallic ions are removed, e.g.,

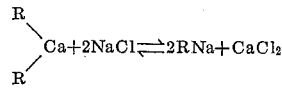

and

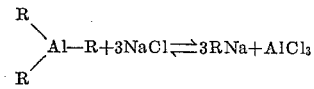

After a measured quantity of brine has been contacted with the unit volume of resin, excess salt solution is removed with a water flush.

(b) The resin is now hydrogenated with a 5- to 10-percent sulphuric acid solution represented by

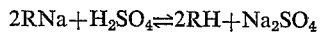

$$2RNa + H_2SO_4 \rightleftharpoons 2RH + Na_2SO_4$$

After a copius water flush, the resin is in ideal condition to be recycled back to cation removal and acid production.

A portion of the sulphuric acid solution used in (b) above can be brought up to strength for organic stripping and the remaining portion can be reused to hydrogenate the ensuing resin regeneration.

It will be apparent from the foregoing that leaching solution, consisting of the product from the cationic resin-exchange cycle, to which fresh nitric acid, sodium chlorate, and polyacylamide, is added, is passed into the underground formation. The pregnant solution pumped from the recovery well 9 and containing the dissolved uranium is either (1) conditioned with air agitation followed by degassification and then pumped to a precipitation circuit or (2) is pumped to the first mixer in a solvent-extraction circuit. The products from the precipitation circuit are concentrated uranium sludge and a neutral nitrate liquor, and from the solvent-extraction circuit, a concentrated uranium liquor and a slightly acidic nitrate liquor. In either case the material containing the concentrated uranium is sent to further purification and the nitrate-bearing liquors, void of uranium, are directed to the metallic-cation-removal circuit. The metallic-cation-removal circuit produces the basic leaching solution and has, as waste products, brine contaminated with metal cations and very slightly acidic water.

It will be apparent from the foregoing that the herein described method of leaching uranium ore is novel and provides an inexpensive, commercially feasible method of recovering uranium from ore bodies located at great depth below the surface. The use of the acidic solution described permits this leaching without the use of heat or excessive pressure and without the necessity of using a flow and counterflow form of circulation of the solution through the ore body.

We claim:

1. The method of recovering uranium from an underground deposit of uranium mineral in situ and located in an existing reservoir of fluid which comprises drilling a recovery well and a plurality of injection wells in a pattern determined by the permeability, porosity and water bearing characteristics of the underground deposit, casing and sealing said wells, introducing an acidic leach solution into said underground deposit through said injection wells in an amount sufficient to displace the existing reservoir fluids in the area defined by the predetermined pattern and to form an island of leach solution about said injection wells and said recovery well and at a pressure below formation fracture pressures so that said leach solution is substantially confined thereabout by the surrounding reservoir of fluid, and subsequently recovering the solution through the recovery well and recovering uranium from the solution.

2. The method of recovering uranium as in claim 1, further including the step of equalizing the introduction and recovery rates to maintain said island of acidic leach solution and recovering uranium from the recovered solution.

3. The method of recovering uranium from underground deposits of uranium mineral as in claim 1 in which said leaching solution contains water solute, about 5 to 25 grams per liter of nitric acid, about 0.5 to 2.0 grams per liter sodium chlorate, and about 5 to 25 parts per million flocculating agent.

4. The method of recovering uranium from an underground deposit of uranium mineral in situ as in claim 1 and in which the formation of the high pressure island of leaching solution is observed by observing the variations of static water level at a planned perimeter spaced away from and generally surrounding the injection and recovery wells.

5. The method of recovering uranium from underground deposits of uranium mineral in situ as in claim 1 in which said leach solution includes a flocculating agent so that fine clay particles are held in a relatively permeable, sponge-like mass and are effectively prevented from forming an impermeable film.

6. The method as in claim 5 in which said flocculating agent is a polymer of acrylonitrile.

References Cited by the Examiner
UNITED STATES PATENTS

| | | | |
|---|---|---|---|
| 2,818,240 | 12/1957 | Livingston | 299—4 |
| 2,896,930 | 7/1959 | Menke | 299—5 |
| 2,954,218 | 9/1960 | Dew et al. | 299—4 |
| 2,964,380 | 12/1960 | Kolodney et al. | 23—14.5 |
| 2,973,811 | 3/1961 | Rogers | 166—9 X |

FOREIGN PATENTS 296,813  9/1928  Great Britain.

OTHER REFERENCES

Uranium-Ore Treatment Procedures, volume 3, Peaceful Uses of Atomic Energy, 1958, pages 195–200 relied on.

ERNEST R. PURSER, *Primary Examiner.*

BENJAMIN HERSH, CHARLES E. O'CONNELL,
*Examiners.*